July 7, 1942.	R. WATRES	2,289,053
BEARING AND THE LUBRICATION THEREOF
Filed June 12, 1940	4 Sheets-Sheet 1

Inventor
Reyburn Watres
By Peck & Peck
Attorneys

July 7, 1942.   R. WATRES   2,289,053
BEARING AND THE LUBRICATION THEREOF
Filed June 12, 1940   4 Sheets-Sheet 2

Inventor
Reyburn Watres
By Peck + Peck
Attorney

Patented July 7, 1942

2,289,053

UNITED STATES PATENT OFFICE 2,289,053

BEARING AND THE LUBRICATION THEREOF

Reyburn Watres, Scranton, Pa.

Application June 12, 1940, Serial No. 340,165

18 Claims. (Cl. 308—36)

This invention relates to bearings and the lubrication thereof; and the objects and nature of the invention will be apparent to those skilled in the art, in the light of the following explanations of the disclosures of the accompanying drawings showing mechanical expressions or embodiments of the invention as examples from among other organizations and modifications within the spirit and scope of the invention.

Engineers and others skilled in the art of bearings and the lubrication thereof, have for many years recognized the fact that, in order to attain in actual practice the advantages and efficiency theoretically credited to a bearing organization including an intermediate runner, a serious runner speed control problem must first be successfully solved. The bearing organization referred to includes a relatively rotary bearing member, a relatively stationary bearing member, and a bearing runner interposed between said two members to receive from and transmit to said members loads, thrusts, and stresses, with the frictional or other drag of the rotary bearing member on the rotary runner being solely depended on to drive the runner.

Theoretically, the rotation of said runner should be initiated and maintained by the frictional or other drag of the lubricated bearing surfaces of the rotating bearing member on the opposing runner bearing surfaces, while the relative speed of rotation of the runner should theoretically, at least, be reduced to the desired intermediate speed, or to approximately one-half the speed of the rotary member, by the retarding or braking action of the drag of the lubricated stationary member bearing surfaces on the opposing lubricated bearing surfaces of the runner.

This theory presumes that during rotation of the rotary bearing member, the drag at one side or face of the runner will consistently be substantially the same as the drag at the other face of the runner, i. e., that there will uniformly be substantially equal slippage or drag at the opposite sides of the runner, that the drag or slippage at one side will substantially balance the drag or slippage at the opposite side.

As a matter of fact, this theory does not consistently hold true in actual practice where the drag of the bearing surfaces of the bearing members on the complementary bearing surfaces of the runner, is solely depended on to propel and slow down the relative rotation of the runner.

It is practically impossible to dependably assure the desired rotation and operation of the runners in the herein described old bearing organization, to consistently maintain similar bearing surface conditions at the opposite sides or ends of the rotating runner that will approximate equality of the bearing surface drag at both sides or ends of the runner, and consistently maintain relative rotation of the runner substantially at the desired reduced speed.

In actual practice, the rotation of the runner, where driven and retarded solely by the drag between its bearing surfaces and those of the two bearing members, is uncontrolled and uncertain. Under such conditions, there is no predictable assurance that the runner will not unduly adhere to either the rotary bearing member or to the stationary bearing member and thus rotate with and as a part of the rotary member, or remain more or less stationary as a part of the stationary member, during the rotation of the rotary member, regardless of intervening lubricant films.

In an effort to solve this runner control problem, many different lubrication proposals have been advanced for flooding the bearing organization with lubricant to maintain frictional drag producing lubricant films between the bearing surfaces of the runner and those of the bearing members, or to provide the floating runner with annular series of rockable bearing pads or members designed to form wedge like bodies of lubricant for maintaining the lubricant films. However, to the best of my information and belief, these proposals have not in practical use, successfully solved the problem of controlling the speed of a runner, for the reason, among others, that the intermediate runner still remains uncontrolled, under the sole driving and retarding action of the drag between its bearing surface and those of the two bearing members. The oil films between the intervening runner and the opposing bearing members do not act as or constitute runner speed control drive means and cannot be depended on to consistently assure such intermediate relative rotating speed of the runner as is necessary to maintain and to restore substantial equality or balance between the driving drag on one side or end of the relatively rotating runner, and the retarding drag on the other side or end thereof. This assurance of substantial equality or balance at the opposite sides or ends of the runner is essential to the successful operation in practice of a bearing organization that includes an intermediate floating runner. Furthermore, an inherent characteristic of lubricating oil prevents the oil films in this bearing organization, from successfully functioning as hydraulic, or other speed control means for the floating runner, or otherwise restoring or maintaining substantial balance between or equality of the friction or drag conditions on the opposite sides or ends of such runner. It is an inherent characteristic of lubricating oils to decrease in viscosity as temperature increases, and as the viscosity decreases, the coefficient of friction decreases proportionately.

This peculiar inherent characteristic of lubricating oil renders floating runner speed control by intervening oil films alone, physically impossible. For example, if we assume the very unlikely possibility that when said bearing organization is started its floating bearing runner will begin rotating with an initial balance of friction or drag at both sides or ends, giving the runner a desired relative intermediate speed, now, if any of innumerable possible changes should take place, such as the presence of a particle of obstructing foreign matter on one side of the runner, or some shift of load or speed introducing more oil to one side of the rotating runner than the other, or anything or condition that upsets this assumed initial perfect balance, the result must be a greater unbalance of the coefficients of friction. This, for the reason, that a slight increase in speed of slippage at one side surface of the loose, free or floating runner over and above the speed of slippage at its other side surface, is accompanied, according to natural law, by an increase in temperature on the side surface of higher slippage speed which diminishes the coefficient of friction on that side surface, and thus increases the speed at said side surface, when it should, to effect control and restore the desired balance, reduce the speed at said side surface by increasing the coefficient of friction. The necessary balance of speed is inherently impossible from any forces present in lubricating oil films, in the instant situation.

This failure of oil films between the loose runner and the rotary and stationary bearing members to serve as runner speed control drive means, was recognized many years ago by proposal designed to cure this difficulty through the utilization of geared drives apart from the oil films, as by added instrumentalities including positive gearing operatively connecting the runner with the two bearing members.

In the intermediate bearing runner drives heretofore proposed, the gearing positively connecting the runner with the rotary and stationary bearing members includes intermediate relatively-small diameter gear elements that necessarily revolve at objectionably excessive high speeds, far in excess of the driven rotary bearing member speeds, with consequent tendency to wear, breakage, and inefficiency, and furthermore such positive gearing constitutes what is in effect a rigid non-yielding transmission without possibility of yielding slippage or other cushioning action.

In such old organizations, there is possibility of excessive wear, disarrangement, damage and loss of efficiency, by the abrupt stoppage, jar and shock, caused by sudden slowing or halting of the runner, even if only momentary, or by a suddenly applied load, or change in rotary bearing member speed, or other abrupt change in conditions at one or the other side or end of the runner.

These positive gearing drives were abandoned as failures, according to the best of my information and belief, for the foregoing and other reasons.

An object of the instant invention is to provide improved efficient means or instrumentalities as a thing apart from intervening lubricant films, for controlling the relative speed of the interposed runners in bearing organizations of the characteristics described, and to act to overcome those influences of said lubricant films between the runner and other bearing members, that tend to maintain or to increase objectionable unbalance between bearing surface conditions at the opposite sides or ends of the runner, whether or not said bearing organization is of the cylindrical journal type, or the longitudinal thrust type, the wobbler or swash plate thrust type, or any other type to which my invention is adaptable.

A further object of the instant invention is to provide a bearing organization that includes an intermediate floating or loose bearing runner, with an improved, simple and effective instrumentality, adapted to automatically assure the relative rotation of said runner at such relatively reduced speed necessary to maintain substantially equality or balance of the frictional or other drag through lubricant films between the opposite sides or ends of the intermediate rotating runner, and the complementary bearing surfaces of adjoining bearing members, respectively.

Another object of the invention from a specific or species standpoint, is to provide a bearing organization that includes a relatively rotary bearing runner interposed between, in frictional drag relation to, opposing bearing members of said organization, with a differential runner speed control drive instrumentality actuated by a rotating bearing member to elastically or yieldingly exert propelling influences on said runner, apart from said frictional drag.

An additional object, from the species standpoint is to provide a bearing organization wherein a relatively rotatory bearing runner is interposed between opposing bearing members in lubricated bearing relation thereto, with a runner speed control drive instrumentality that includes both actuating and runner speed retarding transmissions acting in opposition to, and/or in the same direction as, the frictional drag on the rotating runner, to maintain the relatively rotating runner at a speed in which the frictional drags on the opposite ends or sides of the runner are substantially in balance.

And a further object of the invention is to provide hydraulic (gas or liquid) means for controlling the rate of rotation or other operative movement of the intermediate ring or runner with respect to the rate of rotation or other operative movement of the rotary member of the bearing, to maintain relative rotary or other movements of said ring with respect to both the rotary and the stationary members of the bearing, with the rate of rotary movement of said ring or runner less than the rate of rotary movement of said rotary bearing member.

And a further object of the invention is to provide certain improvements in details, cooperative organizations, and combinations with the ends in view of providing a high speed heavy duty bearing organization whether of the end thrust or cylindrical journal types, wherein the relative rate of speed of an intermediate rotatable runner or ring is automatically controlled and wherein proper lubrication of the opposing bearing surfaces of said ring or runner and of the stationary and rotary bearing members, is provided for.

With the foregoing and other objects in view, as hereinafter developed, the invention consists in certain novel features, cooperating elements, arrangements, and combinations, and sub-combinations, as more fully explained and described hereinafter, and specified and defined by the appended claims.

In the accompanying drawings, forming part hereof.

In a preferred runner speed control drive instrumentality embodiment within the spirit and scope of my invention, the rotary operative parts thereof are held down to speeds that are approximately intermediate between the zero speed of the stationary member and the speed of the rotary bearing member. Thus, the moving parts of the instrumentality including its intermediate transmission means, are held down to speeds that are substantially less than and that do not exceed the speeds of rotation of the rotary bearing member and its driving shaft or other means.

In a preferred embodiment of my invention, the runner speed control instrumentality, in effect, constitutes added mechanism, with respect to lubricant, such as oil films, or the like, that may be employed in the bearing organization to lubricate the intermediate bearing runner. In the bearing organization, said instrumentality of my invention in the operation of its control drive for the bearing runner may sometimes act in cooperation with the forces inherent in the oil films at one, or the other ends or sides of the runner, and at other times may operate in opposition to the forces inherent in one, or the other or both of said films.

In a preferred embodiment of my invention the runner speed control drive instrumentality is actuated by the rotating bearing member to constantly exert runner rotating propelling force on the bearing runner through such means as will take up the differences of motion by slippage, cushioning or absorbing action without shock, as hereinafter explained.

Said instrumentality includes elastic transmission means that will elastically transmit the rotary bearing member rotation-propelling forces to the runner and cushion shocks and gradually and yieldingly bring about and maintain the desired intermediate runner speed relatively to the rotary bearing member speed.

In such example embodiment of my invention, sudden slowing up of the runner rotation does not cause sudden corresponding stoppage or slowing up of the bearing member rotation, as the transmission includes means rendering the same elastic and capable of slippage to take up or cushion the differences of motion, and thus permit the rotary bearing member to continue its normal rotation while said transmission continues to transmit the runner impelling force from the rotating member to the runner so that the runner remains under the elastically applied rotating urge to overcome whatever force is tending to interfere with the normal differential speed of rotation of the runner.

As the rotating urge elastically applied to the runner overcomes the force retarding the same, the runner will gradually return to its normal relative rotation speed determined by the speed of rotation of the actuating rotary bearing member.

This transmission that includes elastic means, also permits accumulation of power therein when the difference in speed between the rotary member and the runner brings about slippage to elastically restore the substantially differential resultant of the rotating and retarding forces.

This is well illustrated, for instance, by the action of a hydraulic or fluid couple, as one example of a hydraulic transmission. For instance, without desiring to so limit all features of my invention, in a preferred illustrated example of an embodiment of my invention, the runner speed control drive instrumentality includes a fluid or hydraulic transmission couple wherein one couple member rotates with the rotary bearing member and the other and complementary couple member rotates with the interposed rotary bearing runner and applies the rotation impelling force thereto received from the rotating bearing member through the medium of confined travelling transmission fluid operatively and elastically connecting the two couples in such manner that the couple member can rotate at different relative speeds against the elastic resistance of the intervening fluid. By preference, the fluid elastically acts as transmission means between the couple members through the medium of an annular series of spaced buckets or the equivalent thereof, arranged transversely of and in the fluid and moving concentrically with one couple member, and a complementary series of spaced buckets or the equivalent thereof, moving concentrically with the other couple member and likewise arranged transversely in the fluid more or less closely to the first named series of buckets, with clearance, so that the separate series of buckets can with slippage move past each other at different relative rotary speeds against the elastic resistance of the intervening transmission fluid, and thus elastically take up the difference of motion where the rotating bearing member travels at higher speed than the runner, while through the medium of the fluid, runner propelling force will continue to be applied to the runner, while shocks due to sudden relative speed changes, will be cushioned and absorbed by the action of the buckets on the fluid.

Without desiring to so limit all features of my invention and the generic character thereof, I disclose as an example embodiment, a bearing organization wherein my runner speed control drive instrumentality includes hydraulic transmission means, acting with or against oil films that may be employed to lubricate the rotary bearing runner, with such transmission including a fluid or hydraulic couple or transmission between a normally fixed part of the bearing organization and the rotary bearing runner to exert a retarding or braking influence thereon, without desiring to so limit all features of my invention.

This hydraulic or fluid couple that acts to retard runner rotation can be substantially similar in organization and capacity to the hereinbefore described fluid couple or transmission between the rotary bearing member and the bearing runner. This runner retarding couple, in the instant embodiment, provides an annular concentric series of spaced buckets or the equivalent thereof carried by the runner. A fixed part of the bearing organization provides a complementary annular concentric series of spaced stationary buckets or the equivalent thereof, closely arranged in operative relation to the first named series but with clearance to permit rotation thereof. These buckets are submerged, or at least operatively located in a body of confined traveling transmission fluid.

In this embodiment, the two hydraulic or fluid couples, constitute a differential bearing runner speed control drive instrumentality that elastically acts through the medium of transmission fluid, to bring about and maintain substantially uniformity or equality of frictional or other drag at the opposite ends or sides of the runner, acting with or against the drag of runner lubricating means, such as interposed oil films between the runner and opposing bearing members.

In this particular example embodiment, the hydraulic couple or transmission from the rotary bearing member to the runner, and the other and complementary hydraulic couple or transmission between a stationary part and the runner, act simultaneously cooperatively on the runner to exert thereon with a differential action forces that are often in direct opposition so as to automatically bring about and yieldingly maintain the relative speed of runner rotation at which the slippage speed or drag is substantially uniform at the opposite bearing portions of the runner.

Without intending to so limit my invention, the instant embodiment discloses each hydraulic couple provided with its own concentric annular confining channel or chamber for the transmission fluid and complementary sets of buckets. The confined body of transmission fluid in the bearing organization fills these channels whether or not the channels are open to fluid flow from either to the other.

In the particular example embodiments disclosed, the floating runner constantly supports the bearing load of the rotary bearing member, and transmits such load to the relatively stationary or non-rotary bearing member. Also, the annular set of impelling buckets or the like, rotated by the rotary bearing member exerts rotation impelling force on the complementary set of impelled buckets or the like, of the runner, through the medium of the elastic or yielding action of the confined annular body of transmission fluid operatively connecting said sets of buckets and in which said sets of buckets are submerged with clearance for cushioning slippage.

While the term "hydraulic" is employed in a generic sense to include any fluid capable of performing the functions required to carry out my invention, yet I preferably employ a lubricant, such as a suitable lubricating oil. This fluid lubricant fills the two annular channels of the hydraulic transmissions, and is preferably maintained therein under pressure, to cause constant flow therefrom, as may be required, to flood the opposing bearing surfaces of the loose or floating runner and the rotating and non-rotating bearing members, and thereby maintain the lubricant films intervening between such opposing complementary bearing surfaces.

Flowable lubricant can be constantly supplied, if so desired, from a source of supply under suitable pressure, to said two annular channels to constantly maintain therein the required annular bodies of fluid.

If so desired, the two channels in which said bodies of fluid are confined, can be in direct communication by cross ducts, or otherwise, to permit cross flow of lubricant from either channel to the other.

The term "stationary" where applied herein to the bearing member that opposes the rotary bearing member through the rotary floating runner, is employed in a generic sense to mean that such member is normally non-rotary but not necessarily immovable longitudinally of the axis of rotation.

Preferably, the hydraulic transmission that assures relative rotation of the driven intermediate loose or floating runner or bearing member by the rotating action of the driving rotary bearing member, is substantially the same in organization and structure as the hydraulic transmission between said runner and a non-rotary part of the bearing, for example, the non-rotating bearing member, that functions to step down the rotation speed of the runner with respect to the speed of the rotary bearing member, to maintain substantially the same slippage speed between the bearing surfaces of the runner considered as a unit, and the opposing bearing surfaces of the rotary and non-rotary bearing members, respectively.

The instant invention also includes the provision of a runner unit that is made up of more than one loose or floating member, particularly where high speeds and heavy duty are required.

The terms runner and the like, are generically or broadly employed herein to include such loose or floating or like runner or intermediate member as a unit whether composed of one part that serves to reduce the runner speed by only one step, say to about one-half the speed of the rotating bearing member, or whether composed of several cooperating parts, constituting the runner unit, and serving to attain greater reduction in final unit runner speed by several reduction steps, while attaining said object of maintaining substantially surface speed equality between the end bearing surfaces of the runner as a unit and the opposing bearing surfaces of the rotary bearing member and the non-rotary bearing member, respectively.

In other words, the term runner, is herein broadly employed to include a runner unit composed of a multiplicity of loose rings or parts all cooperating through hydraulic transmissions or couples, as well as a runner unit consisting of one part or member, as hereinbefore described.

Where the runner unit is composed of several floating rings or members with cooperating intervening hydraulic transmissions, extending from the rotary bearing member to the non-rotary bearing member, the relation of the rubbing speeds between the adjacent opposing surfaces of said rings will be reduced in the inverse ratio of the number of such rings plus one; that is, such rubbing speeds will be reduced $$\frac{1}{n+1}$$

times, where $n$ represents the number of loose rings. A runner unit consisting of but one such loose ring or member, would reduce rubbing speeds $$\frac{1}{1+1}$$

or substantially one-half. A runner unit composed of three such loose rings or members plus the cooperating hydraulic transmissions, will reduce rubbing speeds on all surfaces from the rotary bearing member to the non-rotary bearing member to substantially one-fourth of that speed which would obtain between the opposing bearing surfaces of the rotating and non-rotating bearing members if the runner composed of said three loose rings were omitted.

Figure 1:
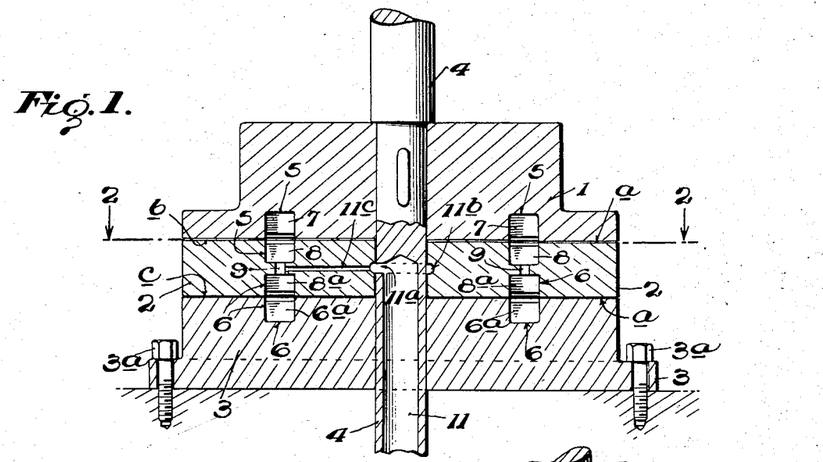
Fig. 1 is a diagrammatical central vertical section of a rotary end thrust bearing including an embodiment of my invention as one example from among others, outer case or housing being omitted.
Figures 2, 4:
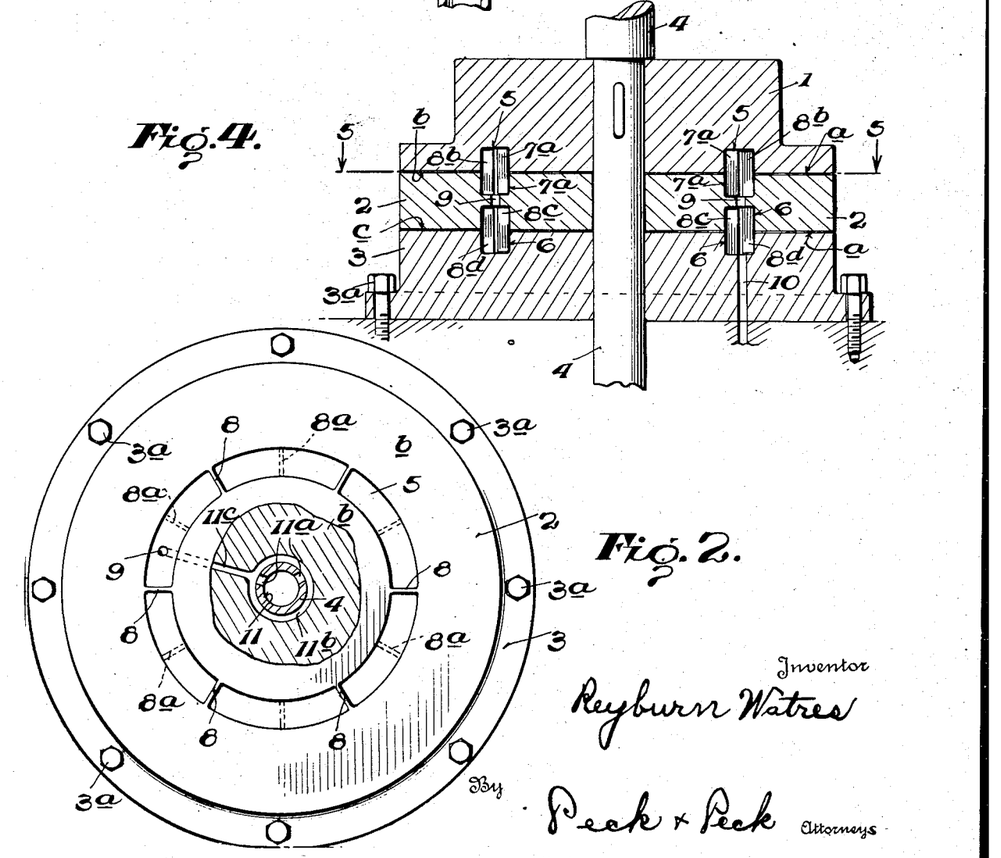
Fig. 2 is a more or less diagrammatical section taken on the line 2—2, Fig. 1, showing one example of fluid supply means.
Fig. 4 is a vertical central section showing modified arrangements of the vanes in the hydraulic channels and a modified fluid supply leading to said channels.
Figures 3, 5, 6:
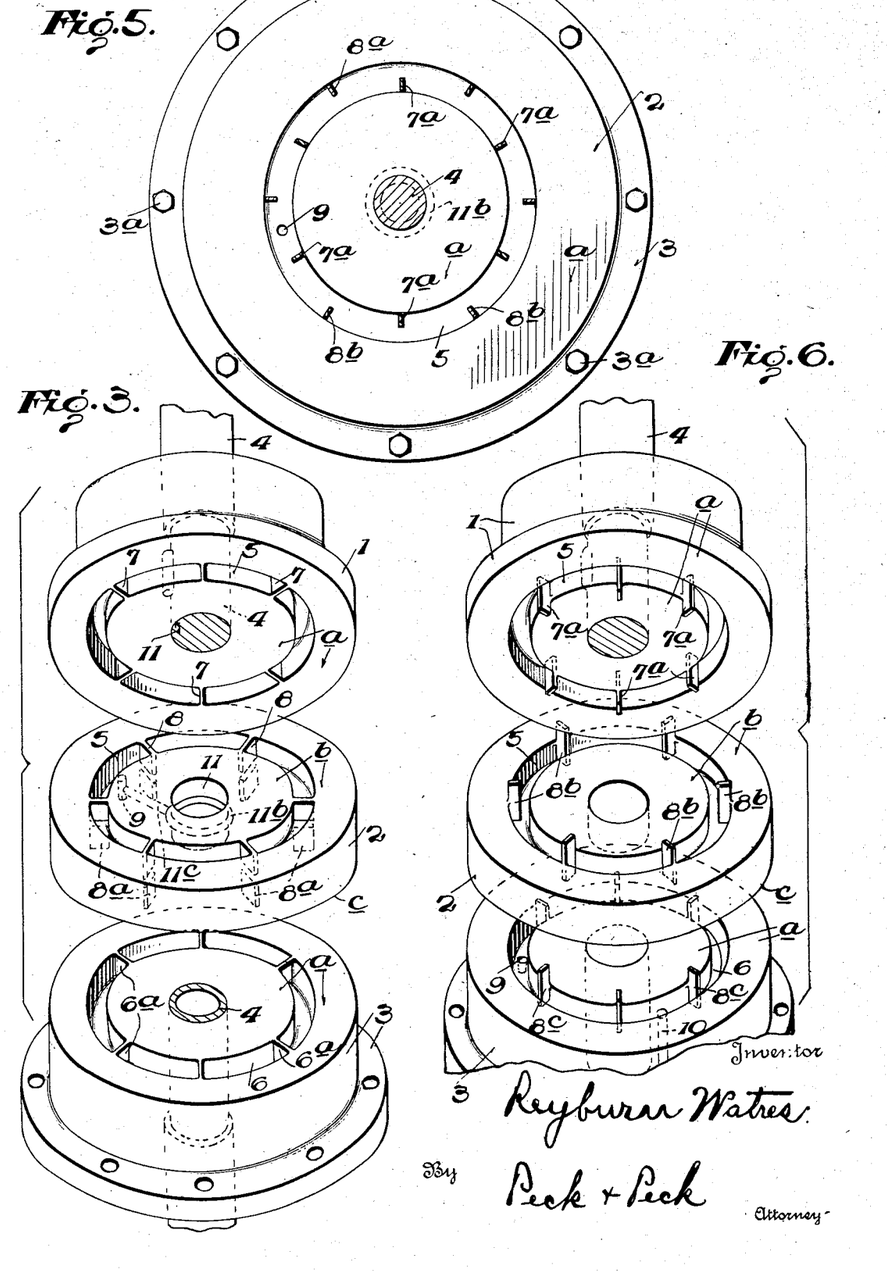
Fig. 3 is a diagrammatical perspective view of the organization of Figs. 1 and 2, with the parts separated to more clearly illustrate the hydraulic transmission channels and the vanes or blades therein.
Fig. 5 is a horizontal section taken on the line 5—5, Fig. 4.
Fig. 6 is a diagrammatical perspective view of the organization of Figs. 4 and 5, showing the parts separated to more clearly illustrate the vane formation and arrangements.

The accompanying drawings by Figs. 1, through 6, somewhat diagrammatically illustrate an end thrust bearing type for a vertical rotary shaft, that includes a preferred embodiment from among others within the spirit and scope of the instant invention. This disclosure omits the housing or exterior casing, and includes a vertical rotary shaft 4, supported and upheld by the rotary bearing member 1, concentric with said shaft and fixed thereto to rotate therewith. The shaft and the rotary bearing member 1, are upheld and supported by the loose or floating rotary bearing member 2, plus the non-rotary bearing member 3. In this particular instance, the member 3, happens to form the supporting base of the organization, and can be secured to any suitable foundation or other support as by bolts or studs 3a, or other means.

If so desired, the shaft 4, can extend downwardly loosely or rotatably through the runner 2, and the non-rotary bearing member with such runner and member concentrically arranged on the shaft. The runner and the member 3, are provided with central alined bores for the passage of the shaft for free relative rotatable movements between the shaft, said runner, and said member. The bearing members 1, and 3, and the interposed runner 2, are, in this example, arranged in parallel horizontal planes perpendicular to the axis of the rotary shaft 4, with the runner interposed between the two members to receive from and transmit thereto longitudinal loads and thrusts.

The top horizontal or end face of the runner provides horizontal bearing surfaces a, and the bottom horizontal or end face of said runner provides substantially similar horizontal bearing surfaces a. The bottom end or face of the rotary bearing member 1, provides horizontal bearing surfaces b, that oppose and are complementary to the top bearing surfaces a, of the runner 2, and these surfaces a, b, are adapted to substantially contact through the medium of a lubricating film or films, for relative slippage and frictional drag, as hereinbefore described.

The horizontal top face of the non-rotary bearing member 3, is also provided with horizontal bearing surfaces c, that are complementary to the bottom bearing surfaces a, of the runner 2, for substantial contact through the medium of lubricating films for relative slippage and frictional drag. In this example, the concentric annular channel for the confined annular body of fluid lubricant, located between the adjoining ends of the rotary member 1, and the runner 2, is provided for by opposing similar complementary grooves 5, of like radius concentric with the axis of rotation, one in the horizontal bottom face of the member 1, and the other in the top face of the runner 2, with the open annular sides of these grooves facing each other to complete the channel, and with the opposing bearing surfaces a, b, substantially contacting to complete the side closures of the channel against lateral or radial leakage of fluid lubricant, except as where necessary to maintain the lubricant films intervening between the bearing surfaces a, b, as hereinbefore described.

The lubricant channel between the non-rotary bearing member 3, and the bottom of runner 2, can, of so desired, be provided for by opposing similar open-side grooves 6, in the under face of runner 2, and the top face of member 3. These grooves 6, are usually similar to grooves 5, to provide the bottom closed annular lubricant channel, for functioning and lubricant distributing to the adjacent bearing surfaces, substantially as does the top channel as hereinbefore described.

In this particular embodiment, Figs. 1, 2 and 3, the rotary bearing member is provided with an annular series of rigid spaced fluid-propelling vanes, buckets or blades 7, radially spanning the groove 5, in said member. The top face of the runner 2, is likewise provided with a complementary substantially similar annular series of spaced rigid runner-propelling vanes, buckets or blades 8, radially spanning the groove 5, in said runner. In this instance, the blades 7, 8, do not project beyond their respective grooves so that clearance is provided for relative rotary movements between the member 1, and the runner 2. Likewise, the under face of the runner 2, is provided with an annular series of rigid radial spaced fluid-propelling vanes, blades 8a, or the like, in its lower groove 6, and the top face of the non-rotary member 3, is provided with a corresponding opposing annular series of rigid radial fluid-flow-retarding spaced vanes 6a, in its top groove 6.

These lubricant channels and the vanes, or the like, therein function and operate as hereinbefore described.

Various means and arrangements can be provided for maintaining the desired lubrication of the opposing bearing surfaces of the rotary and non-rotary members and the interposed runner.

In this example, I take advantage of the presence of the annular bodies of lubricant employed for transmission purposes in the several annular channels, as a lubricant supply for distribution to the several bearing surfaces.

The fluid channels at the top and bottom of the runner are usually connected by any suitable connections to permit fluid flow from one to the other. For instance, I show one or more cross connecting ducts or passages 9, for this purpose.

Any suitable connection from a source of fluid lubricant supply, usually under pressure, can extend through a duct, such as 10, Fig. 4, in the non-rotary member, and discharge into the groove 6, in said member, to thereby maintain the required bodies of fluid lubricant in the two channels and provide for the radial flow of lubricant from said channels to maintain the lubricant films between the bearing surfaces $a$—$b$ and $a$—$c$.

If so desired, as an alternative, the fluid lubricant can be supplied under pressure from a suitable supply or source by suitable connections to a passage or duct 11, longitudially arranged within shaft 4, Figs. 1, 2, 3, and terminating in a radial duct 11a, discharging into annular channel 11b, formed by an annular groove in the cylindrical surface of the central bore through the runner 2. The fluid lubricant is discharged from channel 11b, into the two channels 5, 6, of the hydraulic control through radial duct 11c, in the runner 2, into a cross connection 9, or by any equivalent fluid conducting arrangement.

Any other suitable arrangements can be utilized for supplying and maintaining the necessary supplies of lubricant between the opposing bearing surfaces $a$—$b$, $a$—$c$, and for maintaining the annular bodies of fluid in the annular channels of the hydraulic control, whether or not oil or lubricant is employed to constitute said annular bodies of fluid.

Figs. 4, 5, and 6, show a modified vane, bucket or blade form and arrangement, applied to the organization disclosed by Figs. 1–3.

Instead of the vane arrangement of Figs. 1–3, wherein the vanes radially span their respective grooves without projecting vertically therefrom, in Figs. 4, 5, and 6, the vanes 7a, rigid with the rotating bearing member 1, and the vanes 8b, rigid with the floating runner 2, are longitudinally elongated and reduced in radial width to slightly less than the radial width of the two complementary channel forming grooves, and the same arrangement and form of vertically elongated vanes 8c, and 8d, can be employed in the channel between the non-rotary bearing member 3, and the bottom end of runner 2.

Thus the vanes 7a, rigid with member 1, occupy the vertical depth of the groove 5, in member 1, and slightly less than one-half the radial width of said groove, with their free ends depending vertically into the groove 5, in the top of runner 2. The opposing vanes 8b, rigid with runner 2, occupy the vertical depth of said groove in the runner and less than one-half the radial width thereof and extend therefrom upwardly into the groove 5, in member 1, substantially as shown, with one set of vanes rigid with the outer vertical wall of its groove and the opposing set of vanes rigid with the inner vertical wall of its particular groove. However, the apparatus of Figs. 4, 5, 6, functions and operates the same as the apparatus disclosed by Figs. 1–3, all as hereinbefore described.

In this arrangement of opposing sets of longitudinally elongated vanes, in each hydraulic transmission channel, there is clearance between the outer longitudinal edges of the vanes of the two sets to permit relative rotation of said sets. As all of the vanes of the two opposing sets of vanes in a hydraulic transmission channel extend substantially throughout the vertical or longitudinal transverse length or depth of the channel, such opposing sets will cooperatively function with respect to the fluid in the channel through centrifugal force or by gravity even though, for one reason or another, the transmission fluid becomes depleted.

Figure 7:
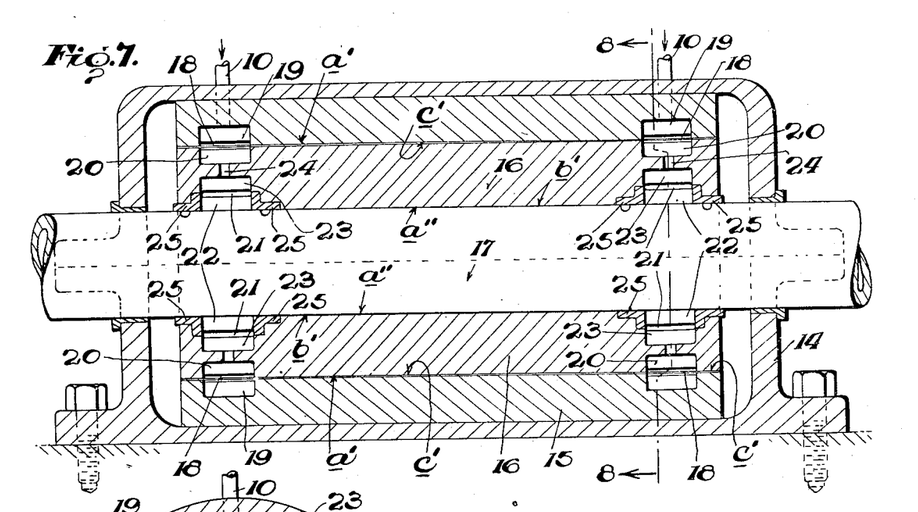
Fig. 7 is a diagrammatical vertical central section of a cylindrical or journal bearing including an embodiment of the instant invention as another example thereof.
Figures 8, 9:
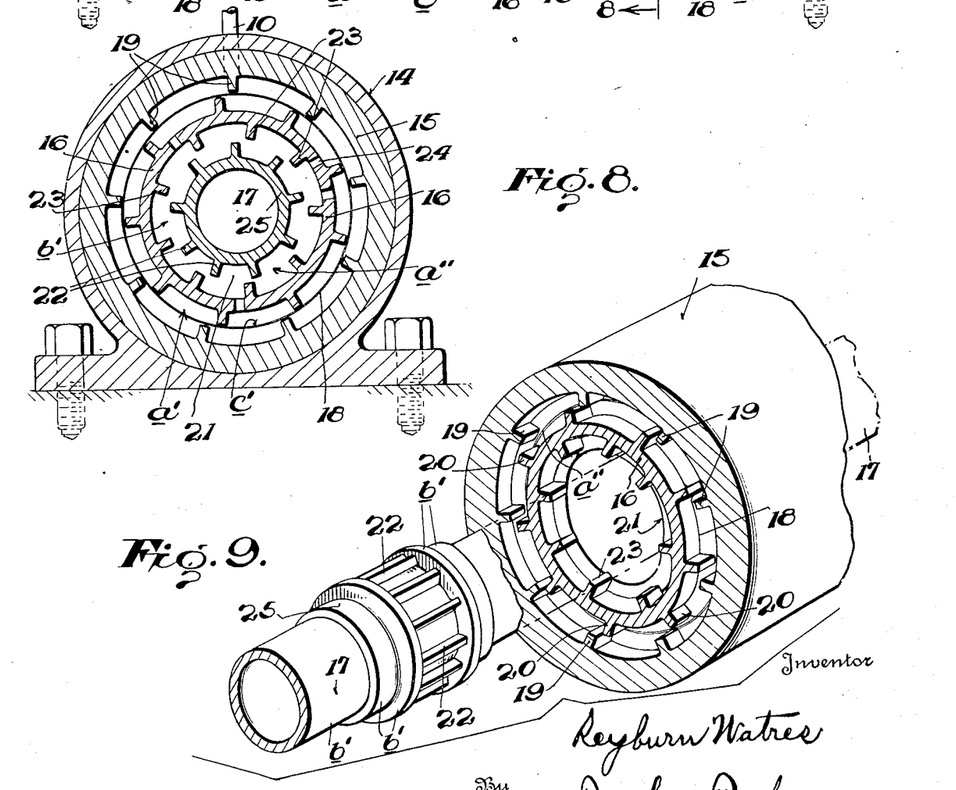
Fig. 8 is a vertical cross section taken on the line 8—8, Fig. 7.
Fig. 9 is a detail diagrammatical sectional perspective, with a portion of the rotary member or shaft separated from the loose, floating or intermediate sleeve-like runner and the non-rotary bearing member.

In Figs. 7, 8 and 9, I diagrammatically disclose an example of an embodiment of my invention applied to and included in a rotary bearing of the cylindrical journal type. In this cylindrical bearing organization a more or less conventional fixed pillow block casing 14, is shown, that internally carries and provides the elongated cylindrical non-rotary (in this instance fixed) bearing member 15, having one or more concentric cylindrical interior bearing surfaces $c'$.

The floating or loose runner or intermediate bearing member 16, is in the form of a cylindrical sleeve concentric with the axis of rotation and hence with the cylindrical inner bearing surfaces $c'$, of the non-rotary bearing surface or member 15. This loose rotary runner 16, is provided with one or more exterior cylindrical concentric bearing surfaces $a'$, opposing and substantially contacting the complementary bearing surfaces $c'$, of non-rotary member 15, preferably through the medium of a film or films of lubricant.

The rotary runner 16, is concentrically mounted on the rotary shaft 17, for relative rotation, and in this example, the shaft extends completely through the runner and beyond the ends thereof, and provides exterior cylindrical bearing surfaces $b'$, complementary to and opposing the inner cylindrical bearing surfaces $a''$, of the runner for contact therewith through the medium of lubricant films.

A cylindrical bearing of this character can be provided with one or more control organizations assuring the desired relative rotation of the runner 16, and for maintaining the desired relative speed of rotation to assure the approximate uniformity of frictional slippage speed between the bearing surfaces $a'$–$c'$ and $a''$–$b'$.

In this cylindrical bearing of Figs. 7–9, I disclose hydraulic control means for the floating or intermediate runner, possessing the same general characteristics and functioning substantially the same as the control means disclosed in Figs. 1, etc.

In view of the longitudinal lengths of the runner and rotating and non-rotating bearing members, I can if so desired, provide the long runner with several duplicate control organizations, located at the opposite ends thereof or otherwise, without departing from the spirit and scope of my invention, as the action on the runner is the same whether one or more such controls are employed.

I happen to show in Fig. 7, duplicate control means, located at the opposite ends of the runner, and the description of one such means, applies to the other. Each control means, in Figs. 7–9, includes the annular fluid channel 18, between the non-rotary bearing member 15, and the intermediate runner 16, formed by the annular groove in the inner cylindrical surface of the non-rotary member containing the annular series of fluid-retarding spaced vanes, blades or buckets 19, rigid with said member, and the complementary opposing annular groove in the outer cylindrical surface of the runner that contains the complementary opposing annular series of fluid-propelling spaced vanes, etc. 20, rigid with said runner. Said means also includes the annular fluid channel 21, between the rotary bearing member 17, and the intermediate runner 16, formed by an exterior annular groove around the rotary bearing member containing the annular series of spaced fluid-propelling vanes 22, or the equivalent thereof, rigid with said rotating member 17, and the complementary opposing interior annular groove in the inner cylindrical surface of runner 16, containing the annular series of complementary spaced runner-propelling vanes 23, or the like rigid with said runner.

This hydraulic control organization, operates and functions in the cylindrical bearing of Fig. 7, the same as in the organizations hereinbefore described. In this Fig. 7 disclosure, the two fluid channels 18, 21, are preferably placed in liquid flow communication by one or more cross ducts 24 and any suitable means, such as ducts and pipe connections, are provided for supplying said channels with fluid, such as flowable lubricant under pressure, or otherwise as hereinbefore described. Also, the fluid lubricant can flow, under pressure or otherwise, laterally from said channels to maintain the lubricant films between the bearing surfaces $b'-a''$, and $a'-c'$, as hereinbefore described.

The groove in rotary member 17, that forms one-half of the fluid channel 21, and that contains the fluid propelling vanes 22 rigid with said member 17, can be formed by an exterior concentric sleeve 25, fixed on shaft 17, providing concentric exterior cylindrical bearing surfaces forming areas of the bearing surfaces $b'$, of said rotary member 17. The inner cylindrical concentric bearing surfaces $a''$, of the intermediate runner 16, has annular cylindrical concentric portions complementary to said bearing surface portions of the sleeve 25.

Figure 10:
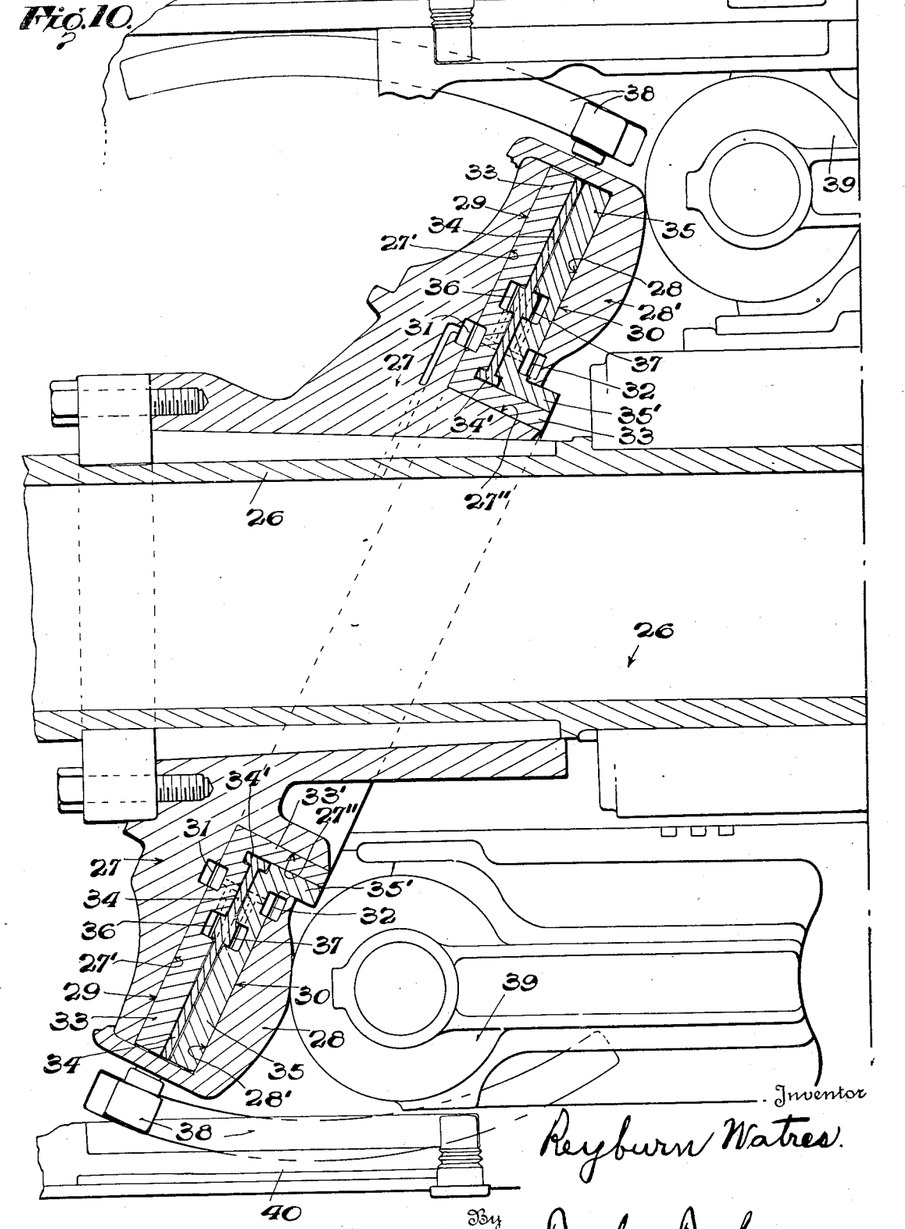
Fig. 10 illustrates diametrically in central vertical section a different embodiment of the instant invention, as another example, forming an end thrust bearing in a pump or motor of the wobbler or slant ring or member type, shown only in part.

Fig. 10 discloses an example of another embodiment within the instant invention. This embodiment provides a longitudinal thrust bearing that includes a rotary bearing member 27, an opposing non-rotary bearing member 28, and a loose or floating runner or intermediate bearing member made up of several floating parts 33, 34, 35, with cooperating hydraulic drives, transmissions or couples, that operate as a runner unit, as hereinbefore described.

Without intending to so limit the instant invention, the drawing illustrates this multiple part runner interposed between and operatively associated with the non-rotary and rotary bearing units of a wobbler or slant plate type of motor, pump or the like, shown only in part. The rotary member of this organization comprises the crankless rotary shaft 26, suitably held against endwise movement, and the rotary wobbler or slant plate or element 27, rigid with this shaft.

This rotary bearing member 27, is provided with the inclined or slant annular bearing surfaces 27', traveling around the longitudinal axis of shaft 26, as a center.

The annular non-rotary bearing member 28, surrounds shaft 26, as a center, and is maintained in parallelism with and in opposition to the slant face 27', of the rotary member 27, and at its inner face is formed with annular bearing surfaces 28', parallel with the bearing surfaces 27', of the rotary member 27.

The floating rotary runner, considered as a unit, is at one end or side face provided with annular bearing surfaces 29, parallel with and complementary to and opposing the bearing surfaces 27', of the rotary member 27, and at its opposite end or side face is provided with annular bearing surfaces 30, parallel with and complementary to and opposing the bearing surfaces 28', of the non-rotary member 28.

These opposing complementary bearing surfaces 27'—29, and 28'—30, are to be constantly flushed with fluid lubricant to maintain lubricant films between each set of opposing bearing surfaces, as hereinbefore described in the explanations of the preceding drawing illustrations.

A hydraulic transmission drive or control 31, for the floating runner is interposed between the rotary bearing member 27, and the adjacent end face of the runner. This hydraulic transmission can be of the same organization and structure and to perform the same functions, as hereinbefore described in connection with Figs. 1, 4, 7, and comprises an annular fluid lubricant body confined in an annular channel formed by the meeting open sides of opposing grooves in the opposing faces of the rotary member and runner with the member having a series of spaced vanes in said channel and the runner also having a corresponding opposing series of vanes in said channel. The rotation of the rotary member 27, will thus cause rotation of the runner, as hereinbefore described.

There is also provided a hydraulic transmission, drive or control 32, for the floating runner, operatively interposed between the non-rotary member 28, and the adjacent end or side of the runner, and this last named hydraulic control 32, can be the same in organization, structure, and function, as those hereinbefore described in referring to Figs. 1, 4, and 7, between the runners and non-rotary bearing members. The hydraulic control 32, includes a confined annular body of fluid lubricant in an annular channel formed by annular opposing grooves in the opposing faces of the runner and non-rotary member 28, with opposing sets of vanes carried by the runner and the member 28, and both located for clearance, in said annular body of fluid.

The intermediate floating bearing runner in Fig. 10, is interposed between the rotary member 27, and the non-rotary member 28, to receive longitudinal thrusts from one member and to transmit the same to the other member, and considering said runner as a unit, the action and function thereof and the runner speed controlling and reducing action of the hydraulic transmissions will be the same as hereinbefore set forth in the descriptions of preceding examples of the instant invention.

The intermediate floating bearing runner of Fig. 10, if composed of one member with its hydraulic control transmissions, as disclosed by the preceding examples, would maintain substantially uniform slip speeds at substantially one-half the rate of rotation of member 27, between the bearing surfaces 27'—29, and 28'—30.

In the specific example Fig. 10, the floating runner is made up of three relatively rotatable members, for example, with cooperating hydraulic transmissions and controls, and is designed to maintain substantially uniform slip speeds between said bearing surfaces 27'—29, and 28'—30, while very materially reducing said uniform slip speed, say, in this example, to about one-quarter of the rate of rotation of the rotary member 27.

In this specific Fig. 10 example, the slant plate side of the rotary member 27, provides a reduced-diameter cylindrical hub providing a circumferential cylindrical bearing surface 27'', at the center of and perpendicular to the slant bearing surface 27'.

The several runner parts or sections 33, 34, 35, in this example, are in the form of substantially flat annular rings or disks arranged face to face and all concentrically centered on said hub and its cylindrical bearing surface 27''. These runner disks are provided with central bores or bearing hubs of different internal diameters.

The runner disk 33, is formed with a central laterally projecting bearing hub 33', having concentric inner and outer bearing surfaces. This hub 33', is rotatably mounted and centered on the bearing surface 27'', of the hub of the rotary bearing member 27.

The intermediate relatively rotary runner disk 34, is formed with a cylindrical center bearing hub 34', having concentric cylindrical inner and outer bearing surfaces. The inner bearing surface of this hub 34', is rotatably centered on the cylindrical outer bearing surface of the hub 33', of the inner end runner disk 33.

The outer end runner disk 35, is formed with a central bearing hub 35', forming concentric cylindrical inner and outer bearing surfaces. The inner cylindrical bearing surface of this hub 35', is rotatably mounted on the outer cylindrical bearing surface of the hub 33', of the inner end runner disk 33.

The intermediate runner disk 34, is provided at its inner end or side, in this instance, with bearing surfaces parallel with, opposing and complementary to the outer side bearing surfaces of the inner end runner disk 33, provision being made for maintaining fluid films between said almost contacting bearing surfaces, as hereinbefore described. The opposite or outer side of said intermediate disk 34, of the runner, also provides bearing surfaces parallel with, complementary to and opposing the inner side bearing surfaces of the outer disk 35, of the runner, and means, such as hereinbefore described, is provided to maintain lubricant films between said just mentioned opposing bearing surfaces.

In this example, the rotation of the inner end or side disk 33, of the runner, drives the intermediate disk 34, at controlled reduced speed through the medium of the friction drag between the complementary bearing surfaces of disks 33, 34, plus the driving and speed-controlling action of hydraulic control transmission 36, interposed between said two disks and, preferably, of the same organization and performing the same functions as the hydraulic control transmission 31, or the similar hydraulic transmissions previously disclosed and described, and described herein.

Also, in this example, the rotation of the intermediate disk 34, of the runner, drives the outer side or end runner disk 35, at relatively reduced speed, through the medium of the friction drag between the complementary bearing surfaces of said disks 34, 35, plus the driving speed-control action of hydraulic control transmission 37, interposed between said two disks 34, 35, and preferably, of the same organization and performing the same functions as the hydraulic control transmission 31, or the similar hydraulic control transmissions heretofore described herein and disclosed by drawings, sheets 1-3.

As hereinbefore described, the speed of rotation of the driven outer end disk 35, is controlled and reduced by the hydraulic control transmission 32, to maintain the reduced speed slip between bearing surfaces 27'—29, substantially the same as the reduced speed slip between bearing surfaces 28'—30.

The floating bearing runner can be composed of one member as disclosed by sheets 1-3, or can be composed of any suitable number of relatively rotary associated bearing disks or members. Obviously, the runners disclosed by sheets 1-3, can be each composed of several cooperating loose disks or other members. The runner of Fig. 10, can be composed of one member, particularly where the speed and duty required does not necessitate greater speed reduction.

It will be understood that any suitable ducts and connections, for supplying fluid lubricant under pressure to and maintaining the same in the hydraulic control transmissions, and therefrom to maintain lubricant films between the opposing bearing surfaces of the rotary, non-rotary and runner disks, are provided, such as the fluid supply and distributing ducts and means hereinbefore described and disclosed by sheets 1-3.

The example multi-part floating runner disclosed by Fig. 10, provides a cylindrical bearing 27'', on which is centered the relatively rotatable cylindrical bearing hub 33', of runner disk 33, and on around said hub 33', is concentrically and relatively-rotatably mounted the cylindrical bearing hub of the runner disk 35, the exterior cylindrical bearing surface of which is arranged within the center open hub of the non-rotary bearing member 28.

The several relatively rotatable disks 33, 34, 35, of the runner are controlled as to rotation speeds by the hydraulic transmissions, and hence, in the example Fig. 10, the concentric cylindrical bearings for the said hubs of runner members 33, 35, provide for friction and speed reduction, on the order of the disclosure of Figs. 7-9.

While Fig. 10, discloses the multi-part floating bearing runner adapted to the thrust bearing of a wobbler or slant type pump or motor, it is not intended to so limit the invention.

The wobbler type organization is disclosed only in part. It will be understood, however, that when adapted as a wobbler t type motor the longitudinally arranged cylinders can be arranged in a circle to face the non-rotary bearing member 28, with the motor pistons, indicated by 39, arranged to successively urge heavy outward longitudinal thrust against non-rotary member 29, which through the medium of the floating runner transmits such thrust to the slant plate rotary member 27, to maintain rotation thereof and shaft 26. When such organization is employed as a pump, the shaft is driven by suitable power to drive the pump pistons through the medium of the wobbler or slant member 27, the floating runner, and the non-rotary member.

Any suitable stop means 38, connected with the housing or frame 40, can be employed to hold member 28, against rotation.

Obviously, oil seals can be provided at the peripheries, and/or hubs or other portions of rotating and other parts to prevent oil leakage from bearing surfaces, and such seals can be composed of rings, disks or strips of felt, leather, or otherwise.

Recognizing the fact that various departures, modifications, omissions, and additions are possible within the scope and spirit of my generic invention as well as under my invention from a specific or species standpoint, and desiring to protect my invention as broadly and specifically as is legally possible over the prior art, what I claim is:

1. A bearing having rotary and non-rotary bearing members; an intermediate loose rotary bearing runner; and added bearing runner hydraulic transmission drive and control means for maintaining the rotation of said runner relatively to the rotary and non-rotary members at a rate less than the speed of rotation of the rotary member, said members and said runner having complementary opposing bearing surfaces adapted to make lubricated working contact.

2. A bearing comprising bearing members, and a floating rotary runner interposed between said members and having bearing surfaces complementary to opposing bearing surfaces of said members respectively, said runner being driven by the rotation of one of said members; fluid transmission means from said rotary member to said runner for applying rotating force to said runner; and fluid transmission means from a non-rotary part of said bearing to said runner for retarding rotation of said runner, said fluid transmission means including fluid propelling vanes carried by the rotary member, runner-propelling and also fluid-propelling vanes carried by the runner, and fluid retarding vanes carried by said non-rotary part.

3. A bearing comprising bearing members, and a floating rotary runner interposed between said members and having bearing surfaces complementary to opposing bearing surfaces of said members respectively, said runner being driven by the rotation of one of said members; fluid transmission means from said rotary member to said runner for applying rotating force to said runner; and fluid transmission means from a non-rotary part of said bearing to said runner for retarding rotation of said runner, said fluid transmission means including fluid propelling vanes carried by the rotary member, runner-propelling and also fluid-propelling vanes carried by the runner, and fluid retarding vanes carried by said non-rotary part, and means providing annular concentric transmission-fluid confining channels between said runner and said members with said fluid propelling vanes of the rotary member and said runner-propelling vanes located in one channel, and said fluid propelling vanes of the runner and said retarding vanes located in the other channel.

4. A bearing comprising opposing bearing members; a loose rotary runner interposed between said members and driven by the rotation of one of said members, the opposite sides of the runner having friction drag bearing surfaces, and said members having complementary friction-drag bearing surfaces opposing runner bearing surfaces, respectively; the opposing sides of the runner and rotary member providing a concentric transmission fluid lubricant annular channel having lateral fluid communication with said friction drag complementary bearing surfaces of the rotary member and runner, said runner and rotary member having opposing sets of vanes located in said channel; the non-rotary member and said runner also providing a concentric transmission-fluid-lubricant annular channel having lateral fluid discharge communication with the complementary opposing bearing surfaces of said non-rotary member and runner, said last-named member and the runner having vanes in said chamber.

5. A bearing, comprising rotary and non-rotary bearing members, and an intervening relatively-rotary floating bearing runner including several cooperating relatively-rotating floating annular disks driven one by the other in succession and primarily driven by the rotation of the driving member, said disks alined and concentric with the axis of rotation of the rotary member, at least two of said disks provided with cylindrical bearing hubs, mounted one on the other, and hydraulic speed control transmissions from disk to disk and between the rotary member and one disk and between the non-rotary member and another disk.

6. In a bearing of the type substantially as described, having bearing members; a floating bearing runner operatively interposed between the bearing members and having bearing surfaces complementary to opposing bearing surfaces mounted for relative rotation; and hydraulic speed reducing and control means for said runner, including annular fluid lubricant confining channels having lateral fluid supplying communication with said bearing surfaces; and means for supplying fluid lubricant to said channels.

7. A bearing organization comprising a relatively-rotary floating intermediate bearing runner mounted between adjoining bearing members in bearing relation thereto through the medium of intervening fluid lubricant films; and a speed control drive instrumentality for said runner that includes hydraulic transmission means including its confined body of transmission fluid lubricant, said organization providing a confining chamber for said body of transmission fluid in communication with said bearings to supply said fluid lubricant films, and means for supplying fluid lubricant to said confined body.

8. A bearing organization comprising opposing bearing members; and a floating intermediate bearing runner between said members in frictional-drag or slippage bearing relation for operation through intervening lubricant films, said runner being subjected to rotational influences under the rotation of one of said members; in combination with a hydraulic speed control drive for said runner also subjected to actuating force by the rotation of said member and also subjecting said runner to rotational influences.

9. A bearing organization comprising a bearing member having frictional-drag bearing surfaces; an intermediate floating relatively rotary bearing runner having bearing portions opposing said member surfaces in runner speed retarding relation; and a rotary bearing member, said rotary bearing member and said runner having opposing frictional drag bearing surfaces for exerting impelling influences on said runner; in combination with hydraulic transmission runner speed reducing and controlling drive means operatively associated with the runner and said members apart from said impelling influences to maintain reduced relative rotation of said runner with substantially equality of slippage speeds between the runner bearing surfaces and the complementary bearing surfaces of said members.

10. A bearing organization comprising opposing bearing members; and an intermediate loose relatively rotary bearing runner having slip bearing surfaces opposing the bearing surfaces of said members in runner impelling and speed retarding relations, respectively; in combination with an added runner speed controlling instrumentality that includes hydraulic transmission drive means operatively connecting said members with said runner.

11. A bearing organization comprising opposing bearing members; and an intermediate floating bearing runner operatively arranged between said members in runner-impelling and runner speed retarding bearing relations, respectively, said runner including several cooperating relatively rotary floating bearing elements; in combination with added hydraulic speed-control drive transmissions from element to element and from a rotary bearing member to the runner and from the runner to the other bearing member.

12. A bearing organization that includes a relatively-rotary runner operatively mounted between opposing bearing members in rotation-impelled and rotation-retarding bearing relations, respectively, said runner including a succession of annular relatively rotatable bearing elements, each being in lubricated bearing relation to the opposing adjoining elements; in combination with added hydraulic transmission couples operatively connecting said elements in successive speed reducing driving relation, and a runner speed control drive instrumentality actuated by the rotation of one of said bearing members for also applying primary impelling force to said runner.

13. A bearing organization comprising a relatively-rotary bearing runner interposed between adjoining bearing members in bearing relation, said runner being subjected to impelling influences by the rotation of a bearing member, said runner including a succession of alined relatively rotatable bearing elements operatively extending from one of said members to the other member with the opposite end elements of such succession in frictional-drag bearing relations to said members, respectively, each element having side bearing portions opposing complementary portions of adjoining elements in lubricated frictional drag relation; and added hydraulic speed control drive transmission means from element to element for subjecting each successive element to propelling influences actuated by the rotation of the preceding element.

14. In a longitudinal thrust bearing organization of the wobbler type, for converting substantially longitudinal thrusts into rotary motion or for converting rotary motion into substantially longitudinal thrust or motion; a rotary bearing runner arranged between opposing bearing members in longitudinal alinement therewith to receive therefrom and transmit thereto substantially longitudinal thrusts, said runner being mounted in frictional-drag bearing relation to said members and subjected to rotation impelling influences by the rotation of one of said members; and a runner speed controlling drive instrumentality also actuated by the rotation of said member to also subject said runner to rotation impelling influences, said instrumentality including added hydraulic transmission means for subjecting said rotating runner to speed retarding influences.

15. A bearing organization comprising an intermediate relatively-rotary bearing runner mounted between opposing bearing members, one of said members being in runner speed-retarding bearing relation to said runner, and the other member when rotated being in runner rotation-impelling bearing relation to said runner; in combination with fluid transmission drive means actuated by said rotating member to also subject said runner to rotation impelling force, and fluid transmission means actuated by the runner rotation for also subjecting said rotating runner to differential speed controlling influences.

16. A bearing organization comprising an intermediate relatively-rotary bearing runner mounted between a rotary member and another member of said organization, in impelled lubricated bearing relation; in combination with hydraulic speed-reducing and control drive means for said runner including a hydraulic runner-impelling couple from said rotary member to said runner, and a hydraulic runner-speed-retarding couple between said other member and said runner.

17. A bearing organization comprising a floating relatively-rotary intermediate bearing runner mounted between opposing bearing members in bearing relation; in combination with added hydraulic runner speed controlling transmission means energized by the rotation of one of said members and controlled by the speed of said rotation to elastically subject the runner to opposing impelling and speed retarding forces for substantially maintaining the runner rotation at a balanced differential intermediate speed.

18. A bearing comprising an intermediate-speed floating rotary bearing runner; bearing members between which said runner is mounted in frictional drag bearing relation, said runner being subjected to rotation impelling urge by the rotation of one of said members; and a yielding-slippage drive that includes impelling means driven by and at the same speed as said rotating bearing member, impelled means moving at the same speed as and applying added rotation impelling force to the runner, and motion transmitting fluid means driven by said impelling means and yieldingly exerting rotation impelling force on said impelled means, whereby the said several means are held against travel speeds in excess of the speed of rotation of said rotating bearing member.

REYBURN WATRES.